United States Patent
Zhang et al.

(10) Patent No.: US 12,046,143 B2
(45) Date of Patent: Jul. 23, 2024

(54) SENSOR FUSION FOR OBJECT-AVOIDANCE DETECTION

(71) Applicant: Aptiv Technologies AG, Schaffhausen (CH)

(72) Inventors: Shan Zhang, Thousand Oaks, CA (US); Narbik Manukian, Los Angeles, CA (US)

(73) Assignee: Aptiv Technologies AG, Schaffhausen (CH)

( * ) Notice: Subject to any disclaimer, the term of this patent is extended or adjusted under 35 U.S.C. 154(b) by 323 days.

(21) Appl. No.: 17/219,760

(22) Filed: Mar. 31, 2021

(65) Prior Publication Data

US 2022/0319328 A1    Oct. 6, 2022

(51) Int. Cl.
*G08G 1/16* (2006.01)
*B60W 30/09* (2012.01)
(Continued)

(52) U.S. Cl.
CPC ............ *G08G 1/165* (2013.01); *B60W 30/09* (2013.01); *B60W 60/0016* (2020.02); *B60W 60/0018* (2020.02); *G01S 7/411* (2013.01); *G01S 13/867* (2013.01); *G01S 13/931* (2013.01); *G06T 7/571* (2017.01); *G06T 7/62* (2017.01); *G06T 7/70* (2017.01); *G06V 10/758* (2022.01);
(Continued)

(58) Field of Classification Search
CPC .. G08G 1/165; B60W 30/09; B60W 60/0016; B60W 60/0018; B60W 2420/42; G01S 7/411; G01S 13/867; G01S 13/931; G06T 7/571; G06T 7/62; G06T 7/70; G06T 2207/10044; G06T 2207/20084; G06T 2207/30261; G06V 10/758; G06V 20/56
See application file for complete search history.

(56) References Cited

U.S. PATENT DOCUMENTS 6,590,521 B1    7/2003   Saka et al.
10,203,696 B2 *  2/2019   Ferguson ............... G06V 20/58
(Continued)

FOREIGN PATENT DOCUMENTS

EP         2674776         12/2013

OTHER PUBLICATIONS

"Extended European Search Report", EP Application No. 22160544.7, Sep. 9, 2022, 15 pages.

*Primary Examiner* — Ig T An (57) ABSTRACT

This document describes techniques, apparatuses, and systems for sensor fusion for object-avoidance detection, including stationary-object height estimation. A sensor fusion system may include a two-stage pipeline. In the first stage, time-series radar data passes through a detection model to produce radar range detections. In the second stage, based on the radar range detections and camera detections, an estimation model detects an over-drivable condition associated with stationary objects in a travel path of a vehicle. By projecting radar range detections onto pixels of an image, a histogram tracker can be used to discern pixel-based dimensions of stationary objects and track them across frames. With depth information, a highly accurate pixel-based width and height estimation can be made, which after applying over-drivability thresholds to these estimations, a vehicle can quickly and safely make over-drivability decisions about objects in a road.

11 Claims, 8 Drawing Sheets

(51) Int. Cl.
  *B60W 60/00* (2020.01)
  *G01S 7/41* (2006.01)
  *G01S 13/86* (2006.01)
  *G01S 13/931* (2020.01)
  *G06T 7/571* (2017.01)
  *G06T 7/62* (2017.01)
  *G06T 7/70* (2017.01)
  *G06V 10/75* (2022.01)
  *G06V 20/56* (2022.01)

(52) U.S. Cl.
  CPC ....... *G06V 20/56* (2022.01); *B60W 2420/403* (2013.01); *G06T 2207/10044* (2013.01); *G06T 2207/20084* (2013.01); *G06T 2207/30261* (2013.01)

(56) References Cited

U.S. PATENT DOCUMENTS

| | | | |
|---|---|---|---|
| 2009/0067675 A1 | 3/2009 | Tan et al. | |
| 2010/0098297 A1* | 4/2010 | Zhang | G08G 1/165 |
| | | | 382/104 |
| 2010/0104199 A1* | 4/2010 | Zhang | G08G 1/166 |
| | | | 382/199 |
| 2019/0384303 A1* | 12/2019 | Muller | G06N 20/00 |
| 2020/0250439 A1* | 8/2020 | Vig | G05D 1/0219 |

* cited by examiner

SENSOR FUSION FOR OBJECT-AVOIDANCE DETECTION

BACKGROUND

In some automobiles, a sensor-fusion system or so-called "fusion tracker" combines information obtained from multiple sensors to draw bounding boxes around objects that may impede travel. The combined sensor data can better estimate each object's position within a field-of-view (FOV) across a variety of conditions. Resizing or repositioning these bounding boxes often involves using expensive hardware that can correlate and fuse the sensor data with sufficient speed to support computer decisions for autonomous or semi-autonomous control.

SUMMARY

This document describes techniques, apparatuses, and systems concerning sensor fusion for object-avoidance detection. In one example, a method includes determining, based on time series radar data obtained from a radar of a vehicle, radar range detections in a road, receiving, from a camera of the vehicle, an image comprising the road, determining, based on the radar range detections and the image, a histogram tracker for discerning dimensions of a stationary object in the road, and determining, from the histogram tracker, a height or width of the stationary object relative to the road, the height or the width being output from the histogram tracker by applying the radar range to an image-based dimension of the stationary object. The method further includes maneuvering the vehicle to avoid the stationary object or pass drive over the stationary object without collision based on an over-drivability condition derived from the height or the width determined from the histogram tracker.

In another example, a method includes receiving a first electromagnetic wave within a first frequency band reflected from an object within a path of a vehicle, receiving an image depicting the object, and adjusting a speed of the vehicle based on a dimension of the object defined by the first electromagnetic wave and the image.

In another example, a system includes a processor configured to perform this and other methods set forth herein. In another example, a system is described including means for performing this and other methods. This document also describes non-transitory computer-readable storage mediums having instructions that, when executed, configured a processor to perform the above-summarized method and other methods set forth herein.

This summary introduces simplified concepts of sensor fusion for object-avoidance detection, which are further described below in the Detailed Description and as shown in the accompanying Drawings. This summary is not intended to identify essential features of the claimed subject matter, nor is it intended for use in determining the scope of the claimed subject matter. Although primarily described in the context of improving fusion tracker matching algorithms, the techniques for sensor fusion for object-avoidance detection can be applied to other applications where matching multiple low-level tracks with a high rate of speed and confidence is desired.

BRIEF DESCRIPTION OF THE DRAWINGS

The details of one or more aspects of providing sensor fusion for object-avoidance detection are described in this document with reference to the following drawings. The same numbers are used throughout the drawings to reference like features and components:

FIG. 1-1 illustrates an example environment of a vehicle with sensor fusion for object-avoidance detection in accordance with one or more implementations of the present disclosure;

FIG. 1-2 illustrates a block diagram of an example vehicle that performs sensor fusion for object-avoidance detection in accordance with one or more implementations of the present disclosure;

FIG. 2-1 illustrates an example situation using a radio wave sensor of an example vehicle that performs sensor fusion for object-avoidance detection in accordance with one or more implementations of the present disclosure;

FIG. 2-2 illustrates an example output of a radio wave sensor of an example vehicle that performs sensor fusion for object-avoidance detection in accordance with one or more implementations of the present disclosure;

FIG. 4-1 illustrates an example image using bounding boxes and a light wave sensor of an example vehicle that performs sensor fusion for object-avoidance detection in accordance with one or more implementations of the present disclosure;

FIG. 4-2 illustrates example histograms of an image in accordance with one or more implementations of the present disclosure;

FIG. 5-1 illustrates an example image obtained using a bounding box and a light wave sensor of an example vehicle that performs sensor fusion for object-avoidance detection in accordance with one or more implementations of the present disclosure;

FIG. 5-2 illustrates a convolutional neural network of a vehicle that performs sensor fusion for object-avoidance detection in accordance with one or more implementations of the present disclosure;

DETAILED DESCRIPTION

Overview

Determining high-level matchings between different sensor tracks (e.g., radar, vision camera, lidar) can be challenging. A sensor fusion system that can fuse together multiple perspectives of an environment can be valuable in terms of providing safety despite the challenges. For example, an autonomous or semi-autonomous vehicle may benefit from performing accurate estimations of objects in a roadway. The estimations may be tied to a control decision to drive over or around an object to avoid a collision.

When it comes to certain dimensions, specifically, height estimations relative to a ground plane on which a vehicle travels, a camera-only or radar-only approach may not be sufficient to support autonomous or semi-autonomous control of the vehicle. However, radar technology can be extremely accurate in estimating a range, typically with poor resolution in determining lateral and longitudinal angles (azimuth and elevation). On the other hand, a vision-camera system can provide accurate estimations of size based on images, as well as accurate lateral and longitudinal angles (azimuth and elevation). Measuring range using images can be difficult; a poor range-estimation may generate an inaccurate image-based height estimation. Similarly, a poor angular resolution from radar may likewise lead to it producing a large height-estimation error if radar is used alone.

This document describes techniques, apparatuses, and systems for sensor fusion for object-avoidance detection, including stationary-object height estimation. A sensor fusion system may include a two-stage pipeline. In the first stage, time-series radar data passes through a detection model to produce radar range detections. In the second stage, based on the radar range detections and camera detections, an estimation model detects an over-drivable condition associated with stationary objects in a travel path of a vehicle. By projecting radar range detections onto pixels of an image, a histogram tracker can be used to discern pixel-based dimensions of stationary objects and track them across frames. With depth information, a highly accurate pixel-based width and height estimation can be made, which, after applying over-drivability thresholds to these estimations, a vehicle can quickly and safely make over-drivability decisions about objects in a road.

One problem overcome by these techniques is in estimating a height and over-drivability condition of stationary objects, such as debris, in a path of a vehicle. By fusing camera and radar data, an example sensor fusion system combines strengths of radar, specifically accurate range detection, with strength of camera-based images, more specifically, accurate angular azimuth and elevation determinations.

Example Environment

Sensors described herein may be used to measure electromagnetic waves. These sensors may be specialized to measure electromagnetic waves within a given wavelength range. As an example, a light receiver may be used as a camera to measure electromagnetic waves within the visible light spectrum. As another example, a radio wave receiver may be used as a radar to measure electromagnetic waves within the radio wave spectrum.

Consider, for example, a radar employed to sense the distance of objects in the surrounding environment. Radio pulses may be transmitted by the radar to the surrounding area. These radio waves may reflect off of the surrounding objects, allowing the range and speed of those objects to be determined.

A vehicle safety or control system may infer not only the range or distance to the object but also the dimensions of the object. For example, the vehicle may use the height of an object for drive-over determinations. The vehicle may require the width of an object for drive-around determinations. Other dimensional or orientational information may provide additional benefits to the vehicle. Although radio wave sensors may provide some indication of object dimensionality, they may not be a reliable source for this information.

Consider, a camera or light wave sensor employed to identify objects in the surrounding environment. Image based processing techniques may be employed to identify objects in images provided by the light wave sensor. As an example, histograms of the object and surrounding environment may be used to identify whether objects are present. Neural networks may detect objects within image data provided by a camera. Although a camera provides some indication of dimensionality, such a light wave sensor may not be a reliable source for this information.

As discussed above, these and other sensors may be used by vehicles to provide vehicle autonomy and vehicle safety. Sensors may be disposed to sense electromagnetic waves or other environmental parameters. Such sensors may individually provide valuable information to vehicle control systems that, when combined with other sensory information, provide environment information that is not directly perceptible using the individual sensors alone.

As one brief example, the range information collected by the radio wave sensor may be combined with the image information collected by the light wave sensor to provide environmental information that is not directly perceptible by sensors individually. The physical characteristics of a light wave sensor may, along with range information, be used to determine real-world dimensions of an object. As pixels within a sensed image from a light wave sensor are given values corresponding to light waves received for a particular location, a number of pixels associated with an object may correspond to real-world dimensions of the object. That is, for a given range, an object occupying a few pixels in a row across a dimension may correspond to a particular size or dimension of an object (e.g., meters, inches) in front of the vehicle. As such, objects impacting vehicle autonomy and autonomous vehicle operation may be detected using information from multiple sensors.

One example of the present disclosure includes sensor fusion for object detection. Indeed, such application of this and other examples provided in this disclosure increases awareness of the environment surrounding a vehicle. These are but a few examples of how the described techniques and devices may be used to provide such environmental information. The document now turns to an example operating environment, after which example devices, methods, and systems are described.

Figure 11:
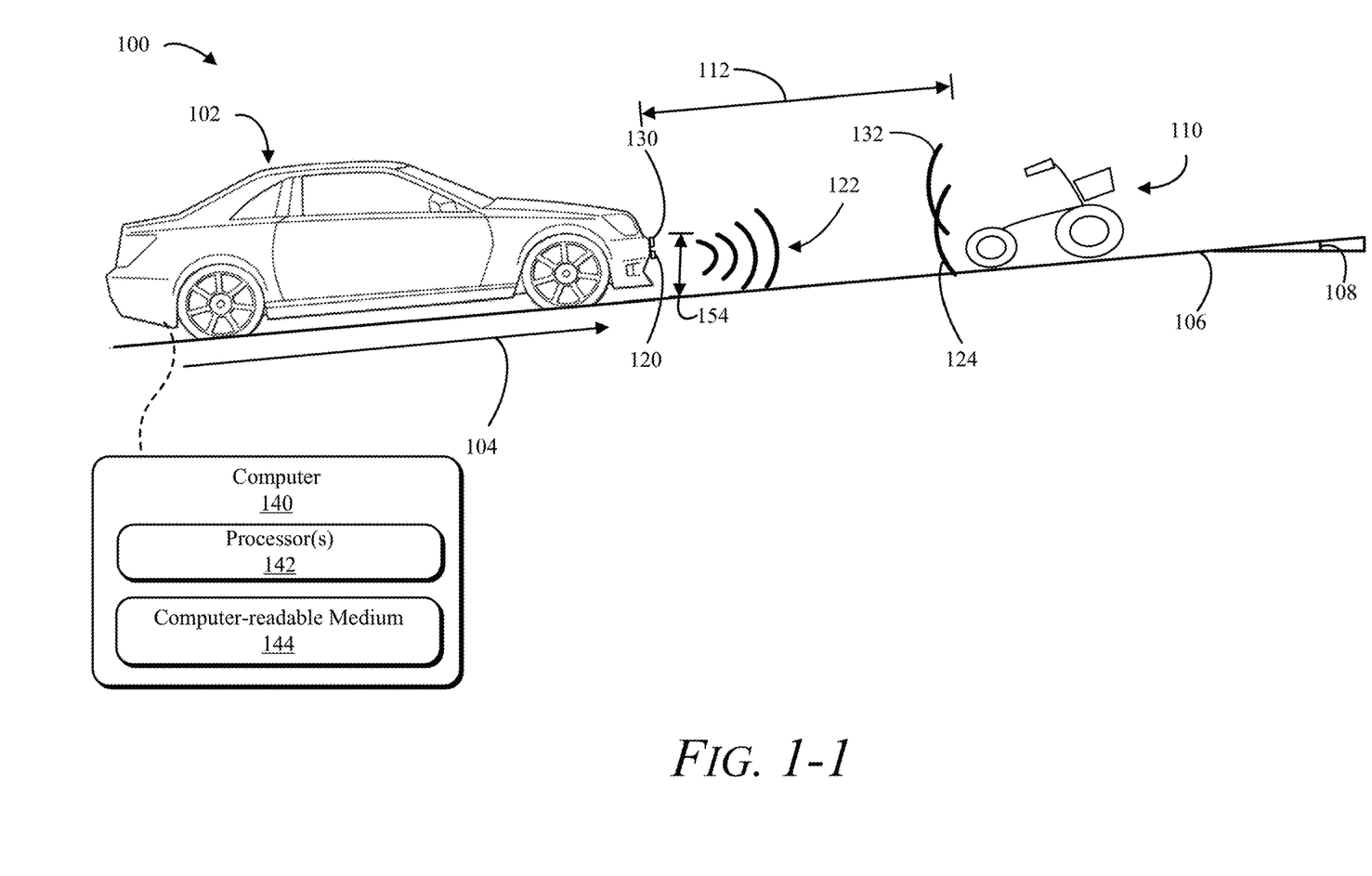

FIG. 1-1 illustrates an environment 100 of a vehicle 102 that performs sensor fusion for object-avoidance detection, in accordance with one or more implementations of the present disclosure. The vehicle 102 may be various types and implementations. For example, the vehicle 102 may be an autonomous or semi-autonomous car, truck, off-road vehicle, or motorcycle. The vehicle 102 may be semi-autonomous or partially autonomous and include safety systems that may autonomously or semi-autonomously control movement including acceleration and direction of the vehicle 102.

The vehicle 102 is moving in a direction of travel 104. As shown, the direction of travel 104 may be forward along roadway 106. The roadway 106 may be associated with a pitch 108 that defines an elevation offset of the vehicle 102 relative to an object 110. The roadway 106 may define a path of the vehicle 102 based on the direction of travel 104. A path may be a course of the vehicle within the roadway 106.

The object 110 may be various roadway obstacles, obstructions, or debris. As an example, the object 110 is a child's tricycle. The object 110 is a distance 112 from the vehicle 102. The distance 112 may be unknown to the vehicle 102 without the use of radar, lidar, other suitable ranging sensors, or combinations thereof. The distance 112 may be relative to a cartesian coordinate system or a polar coordinate system. For example, in terms of a vision sensor, the distance 112 is represented in a unit of measurement relative to x, y, and z coordinates. When deduced from a radar, the distance 112 is a unit of measurement with a magnitude and direction relative to the vehicle 102. For ease of description, unless otherwise noted, the distance 112 as used herein is a measurement in a polar coordinate system, which includes a magnitude or range at a specific azimuth angle and elevation angle from the vehicle 102.

A radio wave transmitter of a radar may send a radio wave 122 toward the object 110. The reflected radio wave 124 may be received, by a radio wave receiver 120 of the radar. A streetlight, vehicle lights, the sun, or other light sources (not shown) may emit light waves that are reflected by the object 110. A reflected light wave 132 may be received by a camera operating as the light wave receiver 130. Although specified as sensors for specific electromagnetic wave categories, the radio wave receiver 120 and the light wave receiver 130 may be electromagnetic wave sensors of various spectrums including such sensor technologies as ultrasound, lidar, radar, camera, infrared, and the like.

The vehicle 102 may include a computer 140 for processing sensor information and communicating with various vehicle controllers. The computer 140 may include a processor or processors for computing sensory data. As an example, the computer 140 may be operable based on instructions stored on the computer-readable medium 144. Various types of computer-readable mediums 144 may be used (e.g., random-access memory (RAM), static random-access memory (SRAM), dynamic random-access memory (DRAM), non-volatile random-access memory (NVRAM), read-only memory (ROM), Flash memory) to digitally store data, including sensory data, on the computer 140 and provide processing buffers. The data can include an operating system, one or more applications, vehicle data, and multimedia data. The data can include instructions in computer-readable form, including a program having instructions operable to implement the teachings of this disclosure. The instructions may be of any implement, including field-programmable gate arrays (FPGA), machine code, assembly code, higher-order code (e.g., C), or any combination thereof.

The instructions may be executable by the processor to follow a combination of steps and executions as provided in this disclosure. As an example, discussed throughout this disclosure, the computer 140 may receive a radio wave 124 within a first frequency band reflected from the object 110 within a path of a vehicle 102. The computer 140 may also receive an image depicting the object 110 and adjust a speed of the vehicle 102 based on a dimension of the object 110. The dimension may be defined according to the radio wave 124 and the image.

Figure 12:
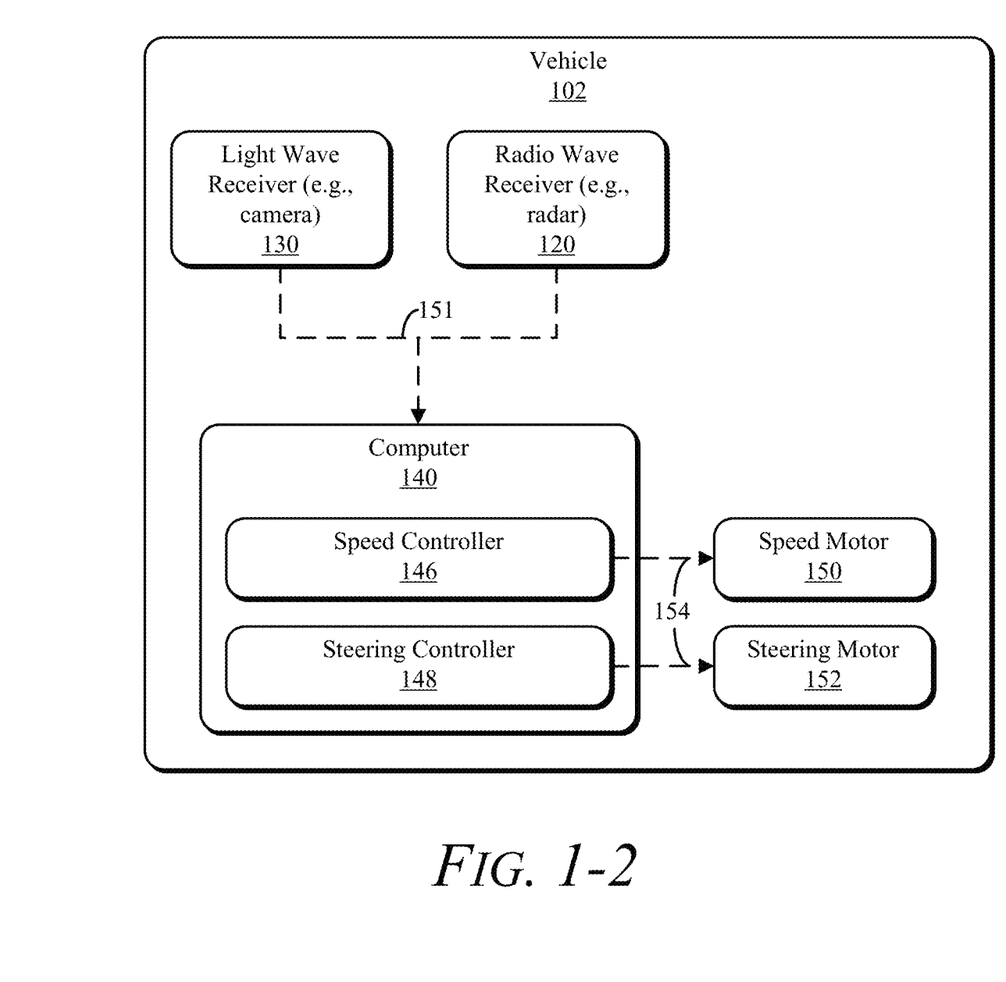

FIG. 1-2 illustrates a block diagram of an example vehicle that performs sensor fusion for object-avoidance detection, in accordance with one or more implementations of the present disclosure. The vehicle 102 includes a camera or light wave receiver 130, a radar or radio wave receiver 120, and the computer 140, including the processors 142 and the computer-readable medium 144. The processors 142 execute a speed controller 146 and a steering controller 148 stored at the computer-readable medium 144. The speed controller 146 and the steering controller 148 of the computer 140 may drive inputs to a speed motor 150 and a steering motor 152, respectively.

The light wave receiver 130 or camera sends data to the computer 140. The light wave receiver 130 may send data to the computer 140 over a controller area network (CAN) bus 151 or another implement including wired or wireless means. The data may be image data based on the reflected light wave 132. The radio wave receiver 120 or radar may also send data to the computer 140 over the CAN bus 151 or another implement. The data may define objects, along with respective distances and speeds.

The computer 140 may execute instructions to calculate dimensional information based on sensor data obtained from the light wave receiver 130 and the radio wave receiver 120. The dimensional information may be processed by the speed controller 146 and the steering controller 148 to output driving instructions to the speed motor 150, the steering motor 152, and other components of the vehicle 102.

As an example, if the dimension associated with object 110 is too large for the vehicle 102 to traverse, the computer 140, speed controller 146, steering controller 148, or a combination thereof may engage a vehicle function. The vehicle function may cause the vehicle 118 to perform evasive maneuvers. For example, based on the dimension, the speed controller 146 may slow the speed of the vehicle 102 using the speed motor 150, or the steering controller 148 may steer the vehicle 102 with the steering motor 152 to alter the direction of travel 104 and avoid the object 110. Other actions may be taken based on the dimension associated with the object 110, depending on situational circumstances.

Figure 21:
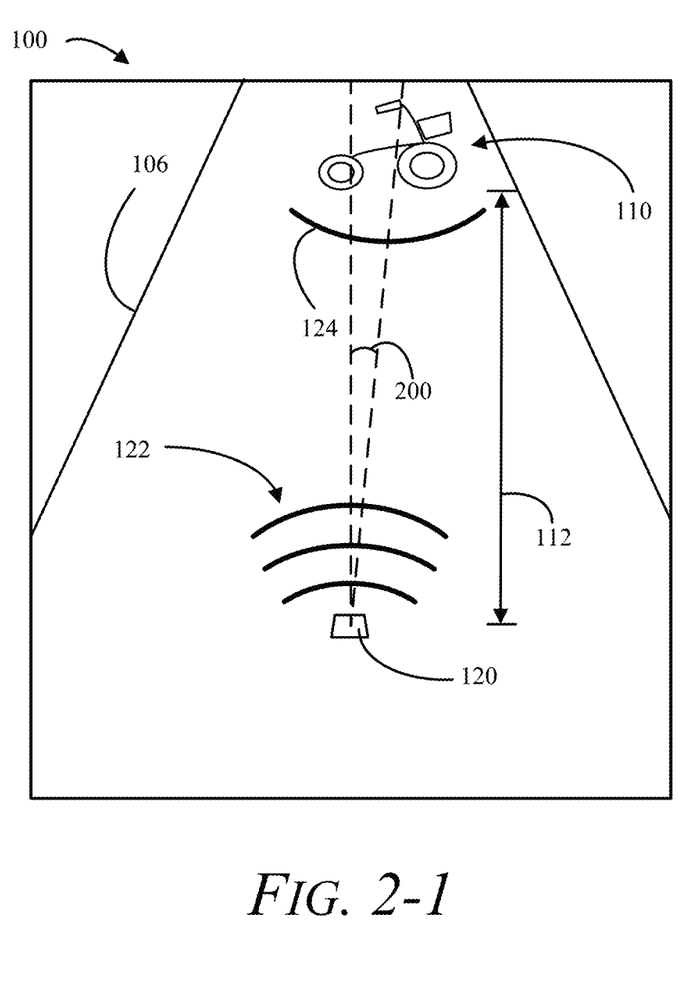

FIG. 2-1 illustrates an example situation using a radio wave sensor of an example vehicle that performs sensor fusion for object-avoidance detection, in accordance with one or more implementations of the present disclosure. The environment 100 of the vehicle 102 is shown with the vehicle 102 omitted for clarity. The vehicle 102 is traveling on a roadway 106. Transmitted radio wave 122 is sent from the vehicle 102 and reflected by the object 110. The reflected radio wave 124 is received by the radio wave receiver 120. The radio wave receiver 120 may determine the distance 112, which is relative to a polar coordinate system, to the object 110 and an azimuth 200, indicating a direction from the vehicle 102 to the object 110.

Figure 22:
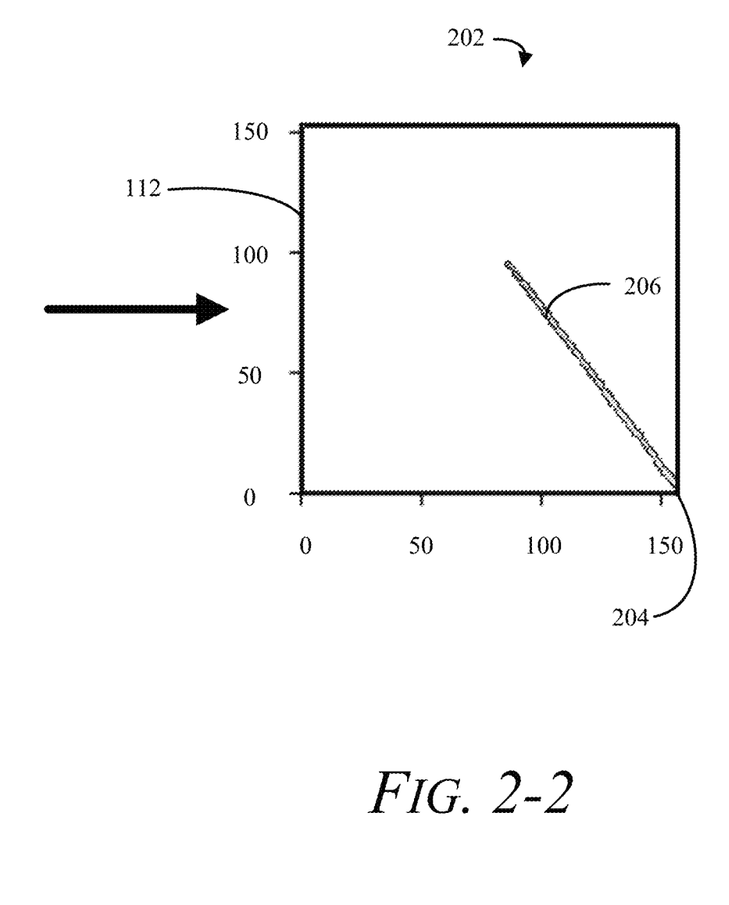

FIG. 2-2 illustrates an example output of a radio wave sensor of an example vehicle that performs sensor fusion for object-avoidance detection, in accordance with one or more implementations of the present disclosure. An output 202 of a radio wave receiver 120 of a vehicle 102 that performs sensor fusion for object detection in accordance with one or more implementations of the present disclosure is shown. The output 202 depicts the distance 112 between the vehicle 102 and the object 110 according to the time axis 204 as an estimated distance 206. As shown, the vehicle 102 is approaching the object 110 and the distance 112 decreases over time. As such, the distance 112 can be used to determine dimensions of the object 110.

Figure 3:
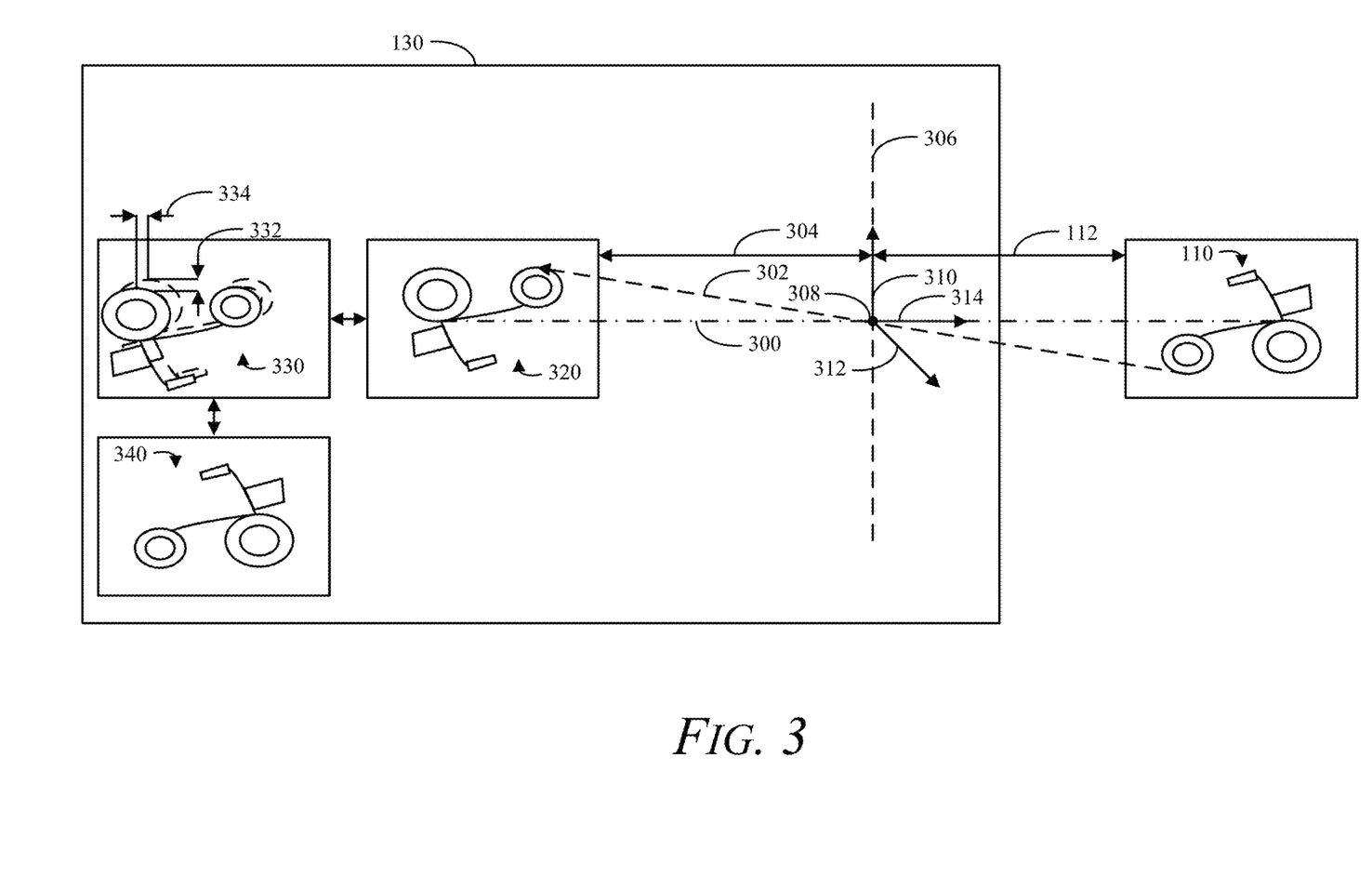
FIG. 3 illustrates an example image captured by a light wave sensor of an example vehicle that performs sensor fusion for object-avoidance detection in accordance with one or more implementations of the present disclosure.

FIG. 3 illustrates an example image captured by a light wave sensor of an example vehicle that performs sensor fusion for object-avoidance detection, in accordance with one or more implementations of the present disclosure. An image 340 captured by a light wave receiver 130 of the vehicle 102 that performs sensor fusion for object detection is shown. As shown, the light waves reflected from the object 110 are received by the light wave receiver 130. The distance 112 between the object 110 and the vehicle 102 is shown as defined by the distance between the object 110 and the lens of the light wave receiver 130. This distance 112 may be the same as the distance 112 described with the radio wave receiver 120 or adjusted by an offset depending on how the radio wave receiver 120 and the light wave receiver 130 are mounted on the vehicle 102. The reflected image 320 may be at the same height as the object 110 and along an axis 300 that is perpendicular to the lens. The lens may be a hole or optical implement. Along the optical axis, the optical origin 308 or center may be defined according to the lenses associated with the light wave receiver 130. In an example, rays 302 of the object are reflected over the axis 300 to form the reflected image 320.

For brevity, the focal point and associated focal length are not shown. The effective focal length 304 (or distance) between the lens axis 306 and the reflected image 320 on an image plane is shown. The ray 302 of the reflected light wave 132 travels through the optical origin 308 to the counterpart position on the reflected image 320. The y-direction 310, x-direction 312, and z-direction 314 depict the relative positions, in a cartesian coordinate system, between the object 110 and the reflected image 320. As shown, the reflected image may be translated into the translated image 330 by camera constant 332 and camera constant 334, with the camera constant 334 in the horizontal direction and the camera constant 332 in the vertical direction. Adjustment of these camera constants 332 and 334 lead us to the received image 340. As shown, the relative position of the object 110 within the received image 340 may be defined in a repeatable manner based on the architecture of the lens and hardware of the light wave receiver 130 based on the distance 112 and the azimuth 200.

Figure 41:
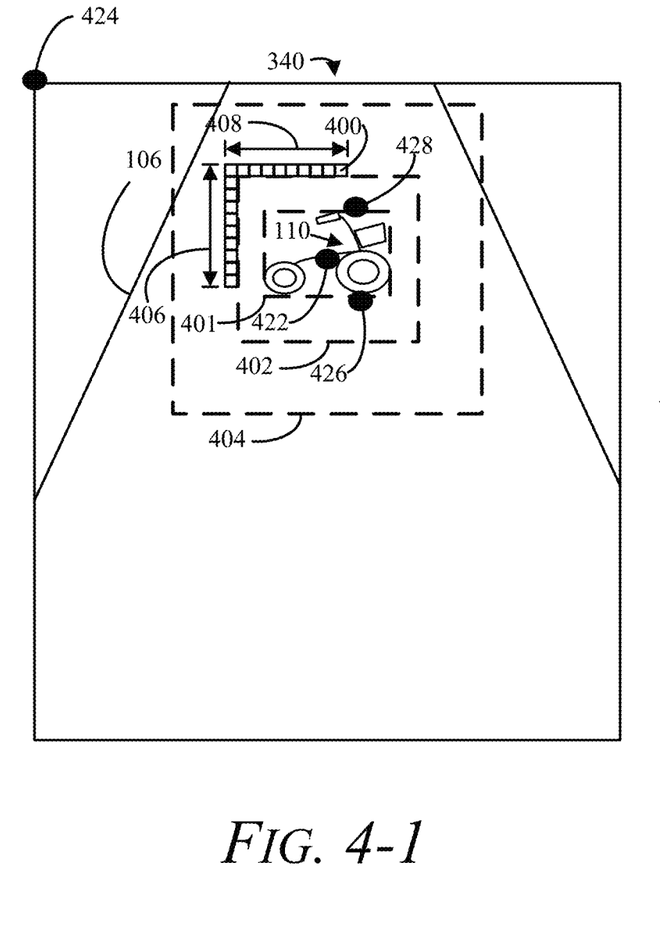

FIG. 4-1 illustrates an example image using bounding boxes and a light wave sensor of an example vehicle that performs sensor fusion for object-avoidance detection, in accordance with one or more implementations of the present disclosure. Image 340 is an example generated using bounding boxes and a light wave receiver 130 of the vehicle 102 that performs sensor fusion for object detection, in accordance with one or more implementations of the present disclosure. The received image 340 may be defined by pixels 400, forming an array as the received image 340. Some pixels 400 have been omitted for brevity and clarity.

The computer 140 may draw a segmented bounding box 401 within an object bounding box 402, which is drawn around the object 110 along with a background bounding box 404 that is drawn around the object 110 to designate area just around and outside the segmented bounding box 401 and the object bounding boxes 402. The segmented bounding box 401, the object bounding box 402, and the background bounding box 404 may be positioned according to the estimated distance 206 and the azimuth 200 with an estimated location 422. In practice, the segmented bounding box 401, the object bounding box 402, and the background bounding box 404 may be only represented through vertices or other modeling. The estimated location may be defined according to an origin 424 of the received image 340. The origin 424 may be defined relative to an intersection between the x-direction 312, the y-direction 310, and the z-direction 314.

As an example, longer estimated distances may place the segmented bounding box 401, the object bounding box 402, and the background bounding box 404 at a lower pixel position on the received image 340. Shorter estimated distances may place the segmented bounding box 401, the object bounding box 402, and the background bounding box 404 at higher pixel positions on the received image 340.

The object bounding box 402 may define the object 110 generally and the segmented bounding box 401 may define dimensions of the object 110 specifically. As an example, the object 110 may be determined to have a pixel height 406 of six pixels and a pixel width 408 of ten pixels and be segmented as defined by the segmented bounding box 401. As shown, a maximum pixel height 428 and a minimum pixel height 426 are defined based on the segmentation of the object 110 in the segmented bounding box 401.

The computer 140 may use the maximum pixel height 428 and the minimum pixel height 426 to define the real-world height of the object 110. As such, the computer 140 may send this information to the speed controller 146, and the steering controller 148 to adjust the acceleration or orientation of vehicle 102.

Figure 42:
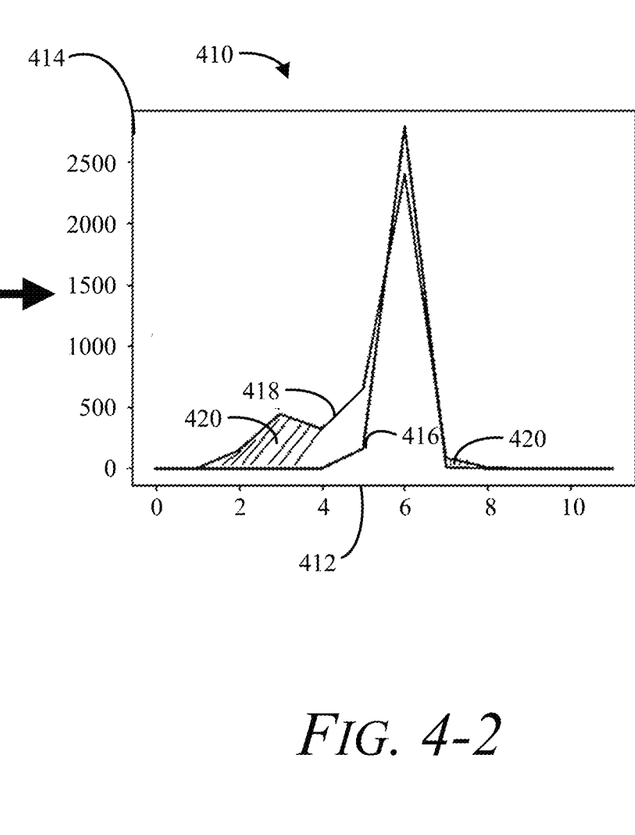

FIG. 4-2 illustrates example histograms of an image in accordance with one or more implementations of the present disclosure. Example histogram representations 410 of a received image 340 in accordance with one or more implementations of the present disclosure are shown. The histogram representations are defined by the frequency 414 of colors bins 412 within the object bounding box 402 and the background bounding box 404.

The computer 140 may output the background bounding box 404 to correspond to the histogram 416. The histogram 416 defines a baseline color frequency of the particular location within the received image 340 based on the background bounding box 404. Similarly, the histogram 418 defines a color frequency of the particular location with the background bounding box 404 based on the object bounding box 402.

A comparison between the histogram 416 and the histogram 418 may be performed to identify histogram portions 420 associated with the object 110. A threshold may be set to define an acceptable range of histogram portion 420, and the object bounding box 402 may be continuously resized to ensure the histogram portions 420 or a ratio thereof is maintained and the segmented bounding box 401 within the object bounding box 402 is sized according to the object 110. As such, the pixel height 406 and pixel width 408 may be defined according to the segmented bounding box 401. As such, the vehicle 102 with light wave receiver 130, a radio wave receiver 120, and the computer 140 are fused to determine dimensions of the object 110. As an example, the computer-readable medium 144 and the processors 142 may store and execute, respectively, instructions to operate a speed controller 146 and a steering controller 148 based on the dimensions.

Figure 51:
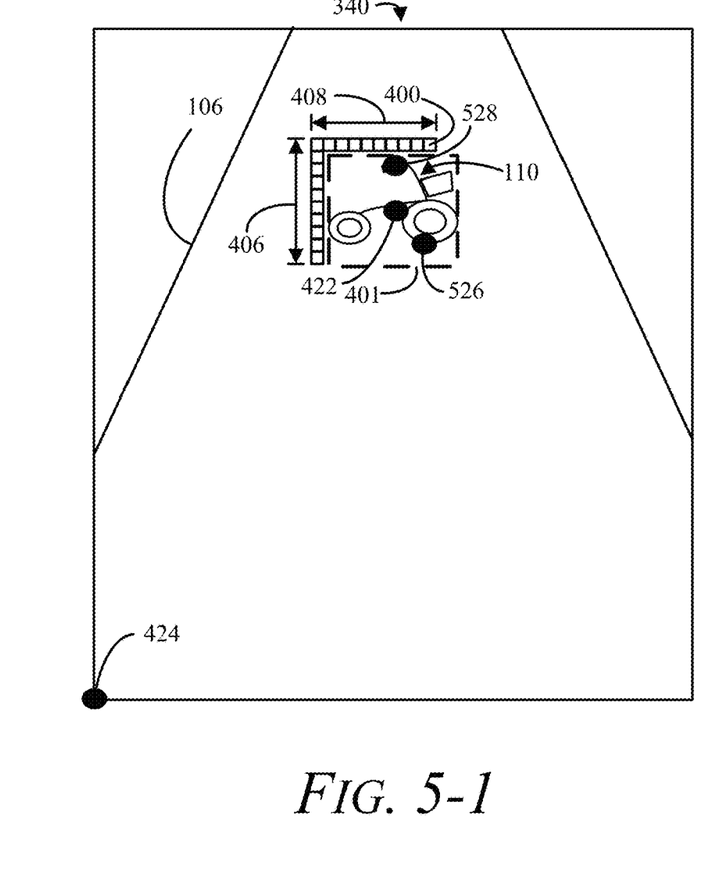

FIG. 5-1 illustrates an example image obtained using a bounding box and a light wave sensor of an example vehicle that performs sensor fusion for object-avoidance detection, in accordance with one or more implementations of the present disclosure. The image 340 shows an example situation using the segmented bounding box 401, which is a segmentation of the object bounding box 402 (not shown), and a light wave receiver 130 of the vehicle 102 to perform sensor fusion for object detection. In this example, the pixel height 406 and pixel width 408 may be determined using a convolutional neural network (CNN).

The CNN is configured to detect the object 110 within the received image 340. A CNN 500 may be used to determine a maximum pixel height 528 and a minimum pixel height 526. The dimensions can be based on the segmented bounding box 401, which may be defined by the CNN 500 or defined as the absolute maximum and minimum pixel values associated with the object in a semantic object recognition implementation.

Figure 52:
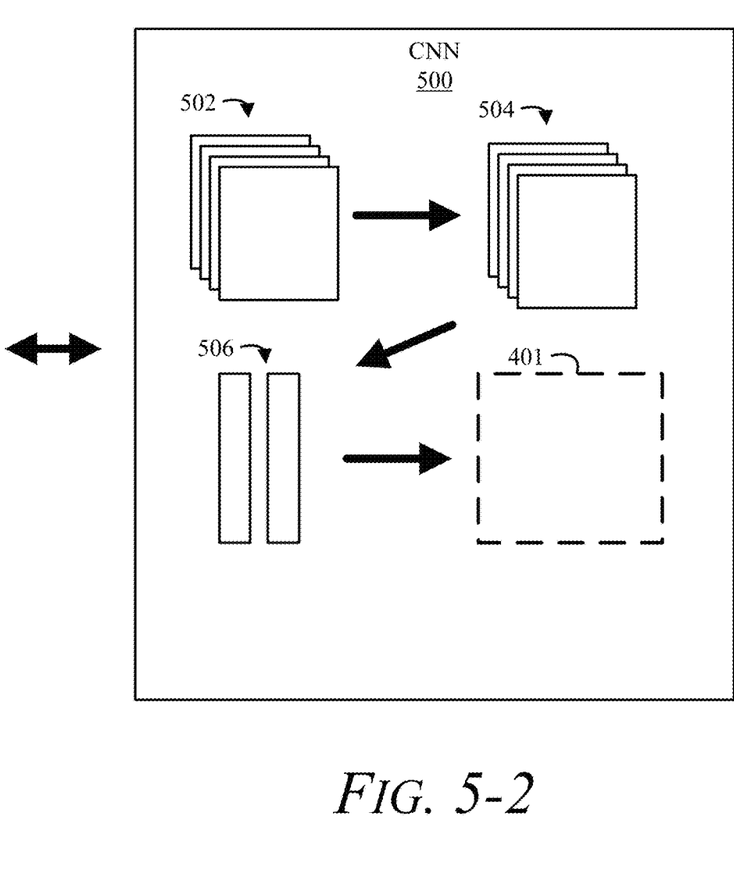

FIG. 5-2 illustrates the CNN 500, in greater detail. The CNN 500 obtains as input, the received image 340 from the light wave receiver 130 of the vehicle 102. The CNN 500 may receive the received image 340 as an array of bytes, each byte pertaining to the value (e.g., color) of the respective pixel in the received image 340.

The CNN 500 may include layers 502, 504, 506 leading to the segmented bounding box 401. Layers may be added or removed from the CNN 500 to improve identification of the segmented bounding box 401. The CNN 500 may provide an additional or cooperating method with sensor fusion of the radio wave receiver 120 and the light wave receiver 130 for defining the segmentation of the object bounding box 402, leading to the dimensions of the segmented bounding box 401 and corresponding dimensions of the object 110.

Figure 6:
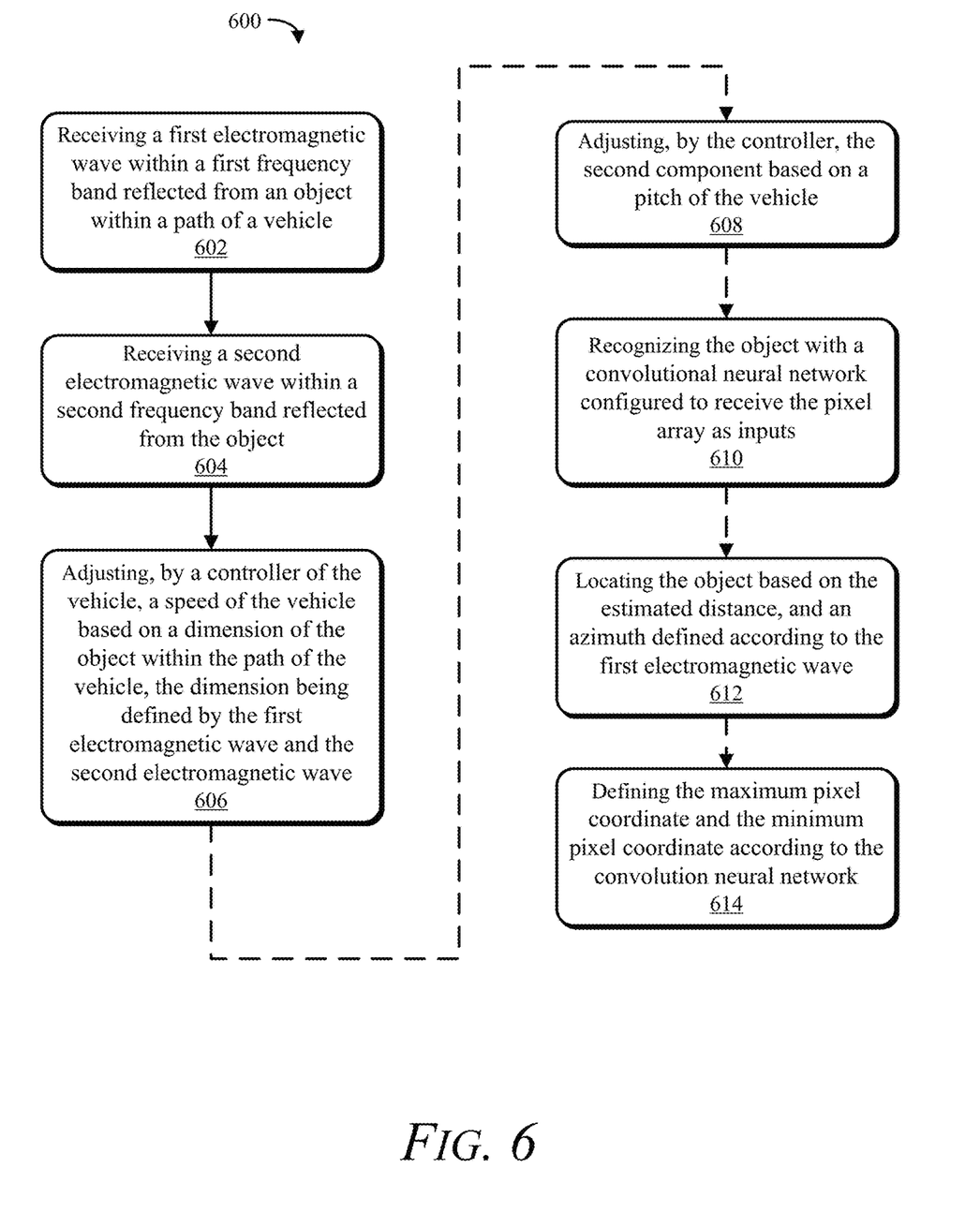
FIG. 6 illustrates an example method of sensor fusion for object-avoidance detection in accordance with one or more implementations of the present disclosure.

FIG. 6 illustrates an example method 600 of sensor fusion for object-avoidance detection, in accordance with one or more implementations of the present disclosure. The process shown in FIG. 6 includes a set of blocks that specify operations and steps performed but are not necessarily limited to the order or combinations shown for performing the operations by the respective blocks. Further, any of one or more of the operations may be repeated, combined, reorganized, omitted, or linked to provide a wide array of additional and/or alternate methods. In portions of the following discussion, reference may be made to the examples of the preceding figures, reference to which is made for example only. The techniques are not limited to performance by one entity or multiple entities operating on one device.

In block 602, a radio wave 122 within a first frequency band reflected from object 110 within a path of a vehicle is received (e.g., using radar). The first frequency band may be a radio wave band. As an example, the computer 140, or portions thereof, may perform one or more steps of the present method 600. As an example, the first frequency band may be between a few Hertz to 300 gigahertz or have wavelengths of 100,000 kilometers to 1.0 millimeters.

In block 604, a light wave 132 within a second frequency band reflected from the object 110 is received (e.g., using a camera). The second frequency band may be a visible light band. As an example, the computer 140, or portions thereof, may perform one or more steps of the present method 600. As an example, the second frequency band may be between a few terahertz to a few petahertz or a wavelength between 100 μm and a few nanometers. Sensors may be used to detect reflected electromagnetic waves. The sensors may include processing and other implements to determine the frequency of received waves and translate such waves into quantitative information, images, other representations, and other combinations thereof.

In block 606, a parameter of the vehicle 102 may be adjusted. The parameter may be a speed of the vehicle 102 or a direction of the vehicle 102 controlled by the speed motor 150 or the steering motor 152. For example, change a steering parameter to cause the vehicle 102 to maneuver around the object 110. The computer 140 may vary a speed parameter to slow or speed the vehicle to avoid the object 110. Other parameters of the vehicle 102 may be adjusted.

The parameter of the vehicle 102 may be adjusted based on the dimension of the object 110. As an example, the dimension of the object 110 may be a height of the object 110 or a width of the object 110. The dimensions of the object 110 may be defined according to pixels 400 of a received image 340.

Radar detections, which are in the polar coordinate system to define a range, azimuth, and elevation relative the vehicle 102, can be obtained and converted to a cartesian coordinate system that is used by a camera, such an X, Y, and Z coordinate system where X is a lateral or horizontal distance from the vehicle 102, Y is vertical distance relative a ground plane of the vehicle 102, and Z is a longitudinal or depth distance from the vehicle 102. One or more of the segmented bounding box 401, the object bounding box 402, and the background bounding box 404 may be placed on the received image 340 according to an estimated location 422 defining pixel coordinates (u, v) based on Equation 1.

$$u = f_i * \frac{X}{Z} + o_i \tag{1}$$

where u is a component of the pixel coordinates in the horizontal direction, $f_i$ is the x-direction 312 component of the effective focal length 304, and $o_i$ is the camera constant 334. This assumes radar estimated range (e.g., the distance 112) is r and the azimuth angle (e.g., the azimuth 200) is θ, then X equals a rotation and translation of r*sin θ and Z equals a rotation and translation of r*cos θ. The object bounding box 402 and the background bounding box 404 may be placed on the received image 340 based on Equation 2.

$$v = f_j * \frac{Y}{Z} + o_j \tag{2}$$

where v is another component of the pixel coordinates in the vertical direction, $f_j$ is the y-direction 310 component of the effective focal length 304, with the estimated distance 206 and $o_j$ is the vertical camera constant 332. One or more of the components u or v may be adjusted to compensate for the pitch 108, and the compensation may include the estimated distance 112 in combination with the pitch 108.

The estimated location 422 of the segmented bounding box 401, the object bounding box 402, and the background bounding box 404 are now known, and the dimensions of the object 110 are determined. The object 110 may be detected based on the histogram portions 420 that have corresponding target points on the received image 340. As such, the object bounding box 402 can be resized based on the distance between the boundary of the segmented box 401 and the object bounding box 402. The dimension may be estimated based on Equation 3 or Equation 4.

$$O_w = \frac{Z * w_p * r_w}{f_i * i_w} \tag{3}$$

In the above, $O_w$ is a width estimation for an actual width of the object 110, and $w_p$ is the pixel width 408 of the segmented bounding box 401. The pixel width 408 may be based on the segmented bounding box 401 or the detected object 110 in the received image 340. As an example, CNN 500 or a segmentation algorithm may be used to determine actual pixels associated with the object 110. In such an instance, the pixel width 408 may be defined as a maximum pixel coordinate and a minimum pixel coordinate of the object 110 on the horizontal or lateral axis. For instance, the object 110 may have a maximum pixel with location (2, 300) and a minimum pixel with location (5, 600), indicating that the maximum pixel width of the object is 5 pixels even if the vertical coordinates are unequal.

Continuing, $r_w$ may be the receiver height 154 of the light wave receiver 130, $f_i$ may be the x-direction 312 component of the effective focal length 304, and $i_w$ is the total image width in pixels. As an example, $i_w$ may be 2 pixels where the object 110 has a height of 300 pixels. As such, the width estimation, $O_w$, is a dimension associated with the object 110 that the computer 140 can then use to operate the vehicle 102 autonomously.

$$O_h = \frac{Z * h_p * r_h}{f_j * i_h} \quad (4)$$

In the above, $O_h$ is a height estimation for an actual height of the object 110, and $h_p$ is the pixel height 406 of the segmented bounding box 401. The pixel height 406 may be based on the segmented bounding box 401 or the object 110 detected in the received image 340. As an example, CNN 500 or a segmentation algorithm may be used to determine actual pixels associated with the object 110 In such an instance, the pixel height 406 may be defined as a maximum pixel coordinate and a minimum pixel coordinate of the object 110 on the vertical or height axis. For instance, the object 110 may have a maximum pixel with location (40, 300) and a minimum pixel with location (150, 310), indicating that the maximum pixel height of the object is 300 pixels even if the horizontal coordinates are unequal. Continuing, $f_j$ may be the y-direction 310 component of the effective focal length 304, and $i_h$ is the total image height in pixels. As an example, $i_h$ may be 600 pixels where the object 110 has a height of 50 pixels. As such, the height estimation, $O_h$, is a dimension associated with the object 110 that the computer 140 can then use to operate the vehicle 102 autonomously.

As referenced herein, adjectives, including first, second, and other, are only used to provide clarity and designation of elements. As an example, the first row 210 and the second row 220 may be interchanged and are only used for clarity when referring to the instant figures.

Figure 7:
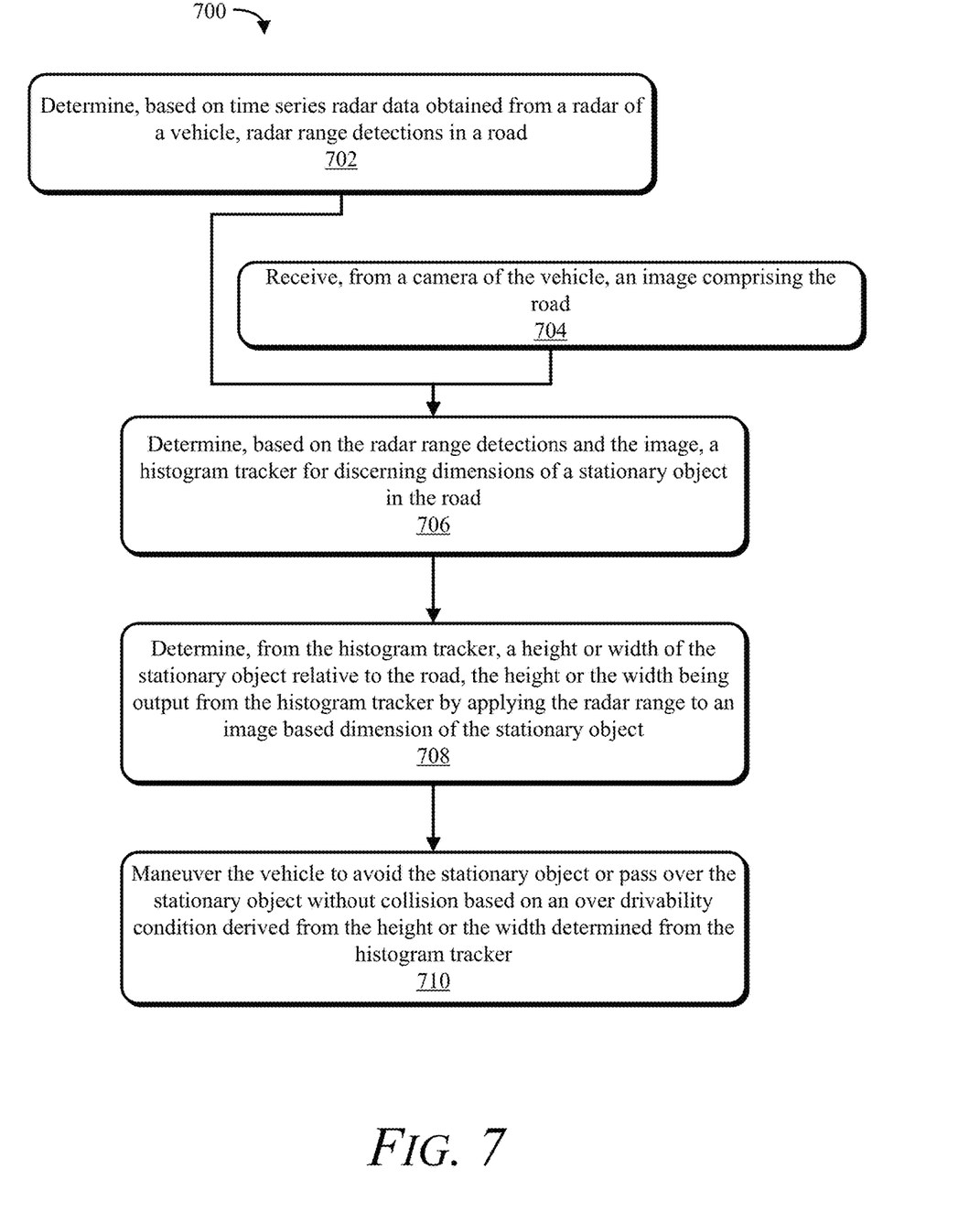
FIG. 7 illustrates another example method of sensor fusion for object-avoidance detection in accordance with one or more implementations of the present disclosure.

FIG. 7 illustrates another example method 700 of sensor fusion for object-avoidance detection, in accordance with one or more implementations of the present disclosure. The process shown in FIG. 7 includes a set of blocks that specify operations and steps performed but are not necessarily limited to the order or combinations shown for performing the operations by the respective blocks. Further, any of one or more of the operations may be repeated, combined, reorganized, omitted, or linked to provide a wide array of additional and/or alternate methods. In portions of the following discussion, reference may be made to the examples of the preceding figures, reference to which is made for example only. The techniques are not limited to performance by one entity or multiple entities operating on one device.

At 702, radar range detections in a road are determined based on time series radar data obtained from a radar of a vehicle. For example, during a first stage of a sensor fusion pipeline, radar range determinations are received from a radar of the vehicle 102.

At 704, an image comprising the road is received from a camera of the vehicle. For example, during a second stage of the sensor fusion pipeline, an image comprising a two- or three-dimensional grid of pixels is received from a camera of the vehicle 102.

At 706, a histogram tracker for discerning dimensions of a stationary object in the road is determined based on the radar range detections and the image. For instance, the outputs from the two stages of the pipeline converge to form a histogram tracker. The computer 140 of the vehicle 102 executes a histogram tracker that generates comparisons of histograms to correlate the radar range detections with the objects in the image data.

At 708, a height or width of the stationary object relative to the road is determined from the histogram tracker, which may apply the radar range as depth information to an image-based dimension of the stationary object. For example, as indicated above, the computer 140 determines a relative height above ground on which the vehicle 102 is traveling, given a height in terms of pixels, at the measured radar range.

At 710, the vehicle maneuvers to avoid the stationary object or pass over the stationary object without collision based on an over drivability condition derived from the height or the width determined from the histogram tracker. For example, the estimated height based on the radar range and camera data may indicate the object is too tall for the vehicle 102 to drive over. Likewise, a width estimated from the radar range and camera data may indicate the object is too wide for the vehicle 102 to avoid without changing lanes or maneuvering around the object.

Determining high-level matchings between different sensor tracks (e.g., radar, vision camera, lidar) can be challenging. For some specific dimensions, height estimations relative to a ground plane on which a vehicle travels, a camera-only or radar-only approach may not be sufficient to support autonomous or semi-autonomous control of the vehicle. By projecting radar range detections onto pixels of an image, a histogram tracker as described herein can be used to discern pixel-based dimensions of stationary objects and track them across frames. With depth information applied to the image, a highly accurate pixel-based width and height estimation can be made, which after applying over-drivability thresholds, a vehicle can quickly and safely make over-drivability decisions about objects in a road. Overcome by these techniques are problems that other sensor fusion systems or radar only or camera only systems may have in estimating a height and over-drivability condition of stationary objects, such as debris, in a path of a vehicle.

EXAMPLES

Example 1. A method comprising receiving a first electromagnetic wave within a first frequency band reflected from an object within a path of a vehicle. The method also comprises receiving an image depicting the object. The method also comprises adjusting a speed of the vehicle based on a dimension of the object defined by the first electromagnetic wave and the image.

Example 2. The method of any of these examples, further comprising determining the dimension according to a pixel array configured to form the image. The dimension being further based on a location of the object within the pixel array according to an estimated distance. The estimated distance being defined according to the first electromagnetic wave.

Example 3. The method of any of these examples, wherein the dimension is defined according to a pixel array configured to form the image, the dimension being further based on a location of the object within the pixel array according to an estimated distance, the estimated distance being defined according to the first electromagnetic wave.

Example 4. The method of any of these examples, wherein the location is defined by pixel coordinates relative to an origin of the pixel array.

Example 5. The method of any of these examples, wherein the pixel coordinates include a first component that is based on the estimated distance and an angle defined according to the first electromagnetic wave and a direction of travel of the vehicle.

Example 6. The method of any of these examples, wherein the first component is further based on a product of a focal length defined by a second receiver of the image and a first ratio between the estimated distance and an azimuthal distance based on the angle.

Example 7. The method of any of these examples, wherein the first component is offset by a first camera constant defined relative to the second receiver and the origin.

Example 8. The method of any of these examples, wherein the pixel coordinates include a second component that is based on the estimated distance and a receiver height of a second receiver of the image defined relative to a first receiver of the first electromagnetic wave.

Example 9. The method of any of these examples, wherein the second component is further based on a product of a focal length defined by the second receiver and a second ratio between the estimated distance and the receiver height.

Example 10. The method of any of these examples, wherein the second component is offset by a second camera constant defined relative to the second receiver and the origin.

Example 11. The method of any of these examples, further comprising: adjusting the second component based on a pitch of the vehicle.

Example 12. The method of any of these examples, wherein the dimension is based on a ratio of a first product and a second product, the first product comprising the estimated distance, a pixel count between the maximum pixel coordinate and a minimum pixel coordinate of the object on an axis of the pixel array, and a receiver height of a second receiver of the image defined relative a first receiver of the first electromagnetic wave, the second product comprising a focal length defined by the second receiver and a maximum pixel position associated with the axis.

Example 13. The method of any of these examples, further comprising: recognizing the object with a convolutional neural network configured to receive the image as an input; locating the object based on the estimated distance, and an azimuth defined according to the first electromagnetic wave; and defining the maximum pixel coordinate and the minimum pixel coordinate according to the convolutional neural network.

Example 14. The method of any of these examples, further comprising: recognizing the object by comparing a first histogram of the pixel array with a second histogram of the pixel array in a location defined by the estimated distance and an azimuth defined according to the first electromagnetic wave; and defining the maximum pixel coordinate and the minimum pixel coordinate according to the first histogram and the second histogram.

Example 15. The method of any of these examples, wherein the first histogram is compared with the second histogram to define target levels to associate a bounding box with the object.

Example 16. The method of any of these examples, wherein the axis is a vertical axis.

Example 17. The method of any of these examples, wherein the first frequency band is a radio frequency band.

Example 18. The method of any of these examples, wherein the dimension is a height of the object.

Example 19. The method of any of these examples, wherein the dimension is a maximum vertical distance of the object.

Example 20. A method, alone or in combination with any of these examples, the method comprising: determining, based on time series radar data obtained from a radar of a vehicle, radar range detections in a road; receiving, from a camera of the vehicle, an image comprising the road; determining, based on the radar range detections and the image, a histogram tracker for discerning dimensions of a stationary object in the road; determining, from the histogram tracker, a height or width of the stationary object relative to the road, the height or the width being output from the histogram tracker by applying the radar range to an image-based dimension of the stationary object; and maneuvering the vehicle to avoid the stationary object or pass drive over the stationary object without collision based on an over drivability condition derived from the height or the width determined from the histogram tracker.

Example 21. The method of any of these examples, wherein the image-based dimension comprises a height or width defined according to a pixel array that forms the image, the height or the width being further defined based on a location of the stationary object within the pixel array and according to an estimated distance from the vehicle to the stationary object, the estimated distance being defined according to the radar range detections.

Example 22. A comprising instruction that, when executed by a processor, configure the processor to perform any of these methods.

Example 23. A system comprising means for performing any of these methods.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method executed on at least one processor of a vehicle, the method comprising:
    obtaining, from a radar of the vehicle, radar data including range detections near a ground plane comprising a road in front of the vehicle;
    determining, based on the range detections and a direction of travel on the road, that a stationary object is in a path of the vehicle at a radar range from the vehicle and at an azimuth angle relative to the vehicle, the azimuth angle indicating a direction of the stationary object relative to the vehicle;
    receiving, from a camera with a focal point on a lens axis that is perpendicular to the ground plane, an image of the road and the stationary object by forming a pixel array having pixels to indicate colors of light captured in the direction of travel at an elevation angle above the road, the image having a total image pixel height and a total image pixel width, and a focal length between the lens axis and a reflection of the image on an image plane having an x-direction component on a horizontal axis and a y-direction component on a vertical axis;

segmenting, based on the radar range, the pixel array to define a first segment of the pixel array to positions on or above the road and at or beyond the radar range, and a second segment of the pixel array to other positions surrounding the first segment;

generating a first histogram for the first segment indicating a frequency of colors across all the pixels within the first segment and a second histogram for the second segment indicating a frequency of colors across all the pixels within the second segment;

comparing the first histogram to the second histogram to identify pixels in the pixel array associated with the stationary object;

determining a pixel height of the stationary object indicating a number of pixels in the pixel array associated with the stationary object on a vertical axis within the image;

determining a pixel width of the stationary object indicating a number of pixels in the pixel array associated with the stationary object on a horizontal axis within the image;

estimating an actual height with respect to the road of the stationary object, by applying the radar range to the image-based height, based on the pixel height of the stationary object, the total image height of the image, the y-direction component of the focal length, the azimuth angle, and the radar range;

estimating an actual width of the stationary object based on the pixel width of the stationary object, the total image width of the image, the x-direction component of the focal length, the azimuth angle, and the radar range; and maneuvering, based on the estimated actual height and the estimated actual width of the object, the vehicle to at least one of drive over the stationary object or drive around the stationary object without a collision.

2. The method of claim 1, wherein comparing the first histogram to the second histogram to identify the pixels in the pixel array associated with the stationary object is performed with a convolutional neural network configured to receive the image as an input.

3. The method of claim 1, wherein the first histogram is compared with the second histogram to define target levels to associate a bounding box with the stationary object.

4. A system comprising a processor in communication with a vehicle radar and a vehicle camera, the processor configured to:

obtain, from the vehicle radar, radar data including range detections near a ground plane comprising a road in front of the vehicle;

determine, based on the range detections and a direction of travel on the road, that a stationary object is in a path of a vehicle at a radar range from the vehicle and at an azimuth angle relative to the vehicle, the azimuth angle indicating a direction of the stationary object relative to the vehicle;

receive, from the vehicle camera when a focal point on a lens axis is perpendicular to the ground plane, an image of the road and the stationary object by forming a pixel array having pixels to indicate colors of light captured in the direction of travel at an elevation angle above the road, the image having a total image pixel height and a total image pixel width, and a focal length between the lens axis and a reflection of the image on an image plane having an x-direction component on a horizontal axis and a y-direction component on a vertical axis;

segment, based on the radar range, the pixel array to define a first segment of the pixel array to positions on or above the road and at or beyond the radar range, and a second segment of the pixel array to other positions surrounding the first segment;

generate a first histogram for the first segment indicating a frequency of colors across all the pixels within the first segment and a second histogram for the second segment indicating a frequency of colors across all the pixels within the second segment;

compare the first histogram to the second histogram to identify pixels in the pixel array associated with the stationary object;

determine a pixel height of the stationary object indicating a number of pixels in the pixel array associated with the stationary object on a vertical axis within the image;

determine a pixel width of the stationary object indicating a number of pixels in the pixel array associated with the stationary object on a horizontal axis within the image;

estimate an actual height with respect to the road of the stationary object, by applying the radar range to the image-based height, based on the pixel height of the stationary object, the total image height of the image, the y-direction component of the focal length, the azimuth angle, and the radar range;

estimate an actual width of the stationary object based on the pixel width of the stationary object, the total image width of the image, the x-direction component of the focal length, the azimuth angle, and the radar range; and maneuver, based on the estimated actual height and the estimated actual width of the object, the vehicle to at least one of drive over the stationary object or drive around the stationary object without a collision.

5. The system of claim 4, the processor being configured to compare the first histogram to the second histogram by using a convolutional neural network configured to receive the image as an input and identify a number of the pixels in the pixel array that are of the stationary object.

6. The system of claim 4, the processor being configured to compare the first histogram with the second histogram to define target levels to associate a bounding box with the stationary object.

7. A non-transitory computer-readable medium comprising instructions that, when executed by a processor, configure the processor to:

obtain, from a vehicle radar, radar data including range detections near a ground plane comprising a road in front of the vehicle;

determine, based on the range detections and a direction of travel on the road, that a stationary object is in a path of a vehicle at a radar range from the vehicle and at an azimuth angle relative to the vehicle, the azimuth angle indicating a direction of the stationary object relative to the vehicle;

receive, from a vehicle camera when a focal point on a lens axis is perpendicular to the ground plane, an image of the road and the stationary object by forming a pixel array having pixels to indicate colors of light captured in the direction of travel at an elevation angle above the road, the image having a total image pixel height and a total image pixel width, and a focal length between the lens axis and a reflection of the image on an image plane having an x-direction component on a horizontal axis and a y-direction component on a vertical axis;

segment, based on the radar range, the pixel array to define a first segment of the pixel array to positions on or above the road and at or beyond the radar range, and a second segment of the pixel array to other positions surrounding the first segment;

generate a first histogram for the first segment indicating a frequency of colors across all the pixels within the first segment and a second histogram for the second segment indicating a frequency of colors across all the pixels within the second segment;

compare the first histogram to the second histogram to identify pixels in the pixel array associated with the stationary object;

determine a pixel height of the stationary object indicating a number of pixels associated with the stationary object on a vertical axis within the image;

determine a pixel width of the stationary object indicating a number of pixels in the pixel array associated with the stationary object on a horizontal axis within the image;

estimate an actual height with respect to the road of the stationary object, by applying the radar range to the image-based height, based on the pixel height of the stationary object, the total image height of the image, the y-direction component of the focal length, the azimuth angle, and the radar range;

estimate an actual width of the stationary object based on the pixel width of the stationary object, the total image width of the image, the x-direction component of the focal length, the azimuth angle, and the radar range; and maneuver, based on the estimated actual height and the estimated actual width of the object, the vehicle to at least one of drive over the stationary object or drive around the stationary object without a collision.

8. The computer-readable medium of claim 7, wherein execution of the instructions further configures the processor to compare the first histogram to the second histogram using a convolutional neural network configured to receive the image as an input and identify a number of the pixels in the pixel array that are of the stationary object.

9. The method of claim 1, further comprising:
determining whether the estimated actual height of the stationary object is less than an over-drivability threshold with respect the vehicle and the road; and
responsive to determining that the estimated actual height is less than the over-drivability threshold, maintaining the path of the vehicle to drive over the stationary object.

10. The method of claim 9, further comprising:
responsive to determining that the estimated actual height is less than the threshold, maintaining an over-drivability condition associated with the stationary object that enables a vehicle control decision for driving over the stationary object.

11. The method of claim 9, wherein the stationary object comprises road debris in the path of the vehicle.

* * * * *